Figure 1:
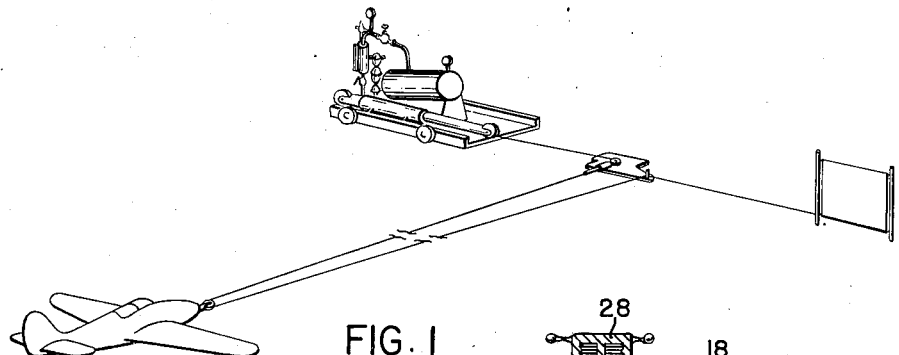

Nov. 22, 1949  R. B. COTTON  2,488,525
HYDRAULIC SYSTEM
Original Filed Oct. 28, 1943  4 Sheets-Sheet 1

Inventor
ROBERT B. COTTON
Attorney

Nov. 22, 1949  R. B. COTTON  2,488,525
HYDRAULIC SYSTEM
Original Filed Oct. 28, 1943  4 Sheets—Sheet 2
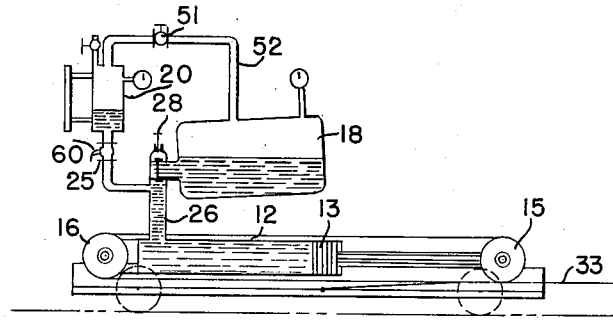
FIG. 6
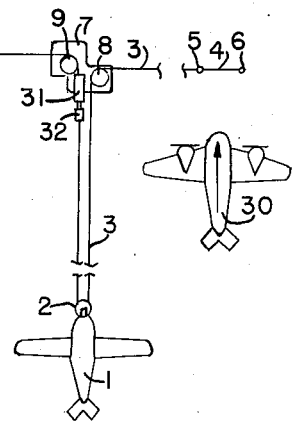
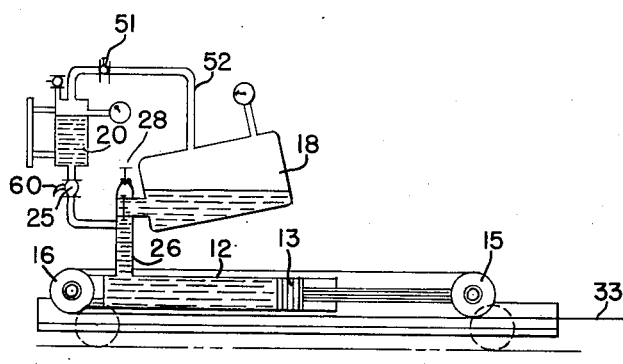
FIG. 7
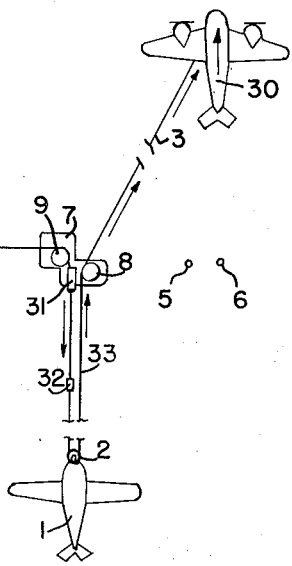
Inventor
ROBERT B. COTTON
By J. E. Bush
Attorney Nov. 22, 1949    R. B. COTTON    2,488,525
HYDRAULIC SYSTEM
Original Filed Oct. 28, 1943    4 Sheets-Sheet 3
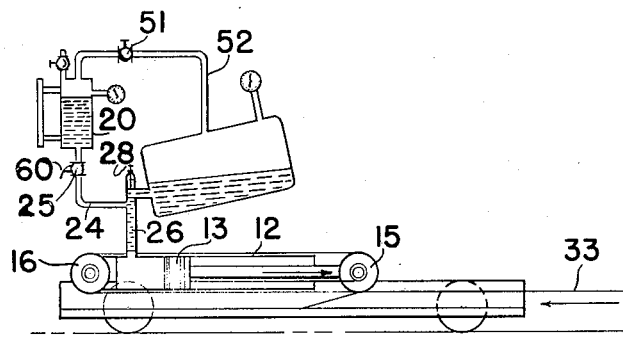
FIG. 8
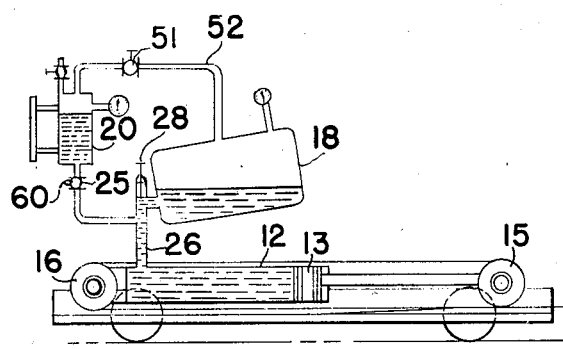
FIG. 9
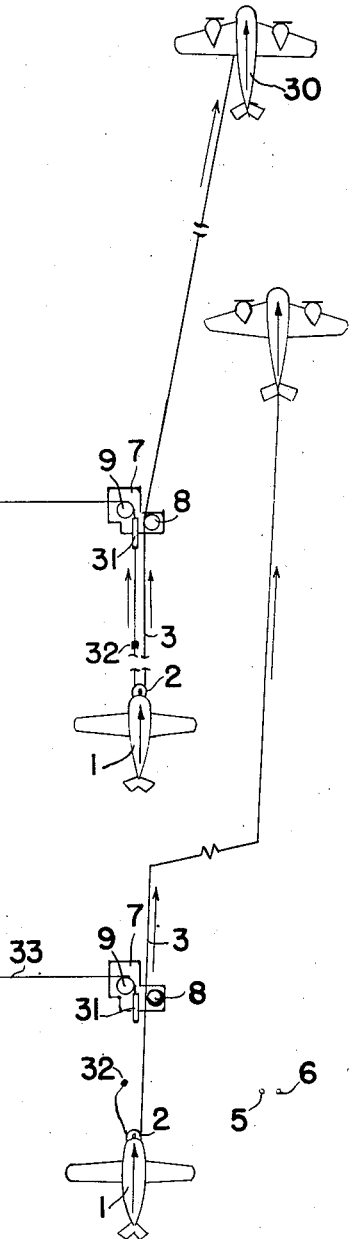
Inventor
ROBERT B. COTTON
By  P. E. Bush
Attorney Nov. 22, 1949     R. B. COTTON     2,488,525
HYDRAULIC SYSTEM
Original Filed Oct. 28, 1943     4 Sheets-Sheet 4

Inventor
ROBERT B. COTTON
By J. E. Bush
Attorney

Patented Nov. 22, 1949

2,488,525

UNITED STATES PATENT OFFICE 2,488,525

HYDRAULIC SYSTEM

Robert B. Cotton, Lansdowne, Pa.

Original application October 28, 1943, Serial No. 507,931, now Patent No. 2,432,508, dated December 16, 1947. Divided and this application October 24, 1944, Serial No. 560,091

10 Claims. (Cl. 267—1)

(Granted under the act of March 3, 1883, as amended April 30, 1928; 370 O. G. 757)

This is a division of application Serial No. 507,931, filed October 28, 1943, now Patent No. 2,432,508, December 16, 1947. The invention disclosed in the parent application relates to glider pickup apparatus of the type in which the glider which is at rest to begin with, is given a steady acceleration by energy obtained from a plane in flight until it reaches the speed of the plane, at which time a towline which has been picked up by the plane and which is connected to the apparatus, is released therefrom, and is gripped by a device on the glider for the subsequent towing of the glider by the plane.

The energy necessary for accelerating the glider with a steady and reasonable acceleration is transferred from the plane in flight by means of a constant force applied to the glider, until it attains the speed of the plane and then the towline is fixed for the subsequent towing of the glider by the plane.

This is accomplished without the necessity of carrying any of the apparatus in the glider or plane, except for a very light pulley on the glider comprising a part of the gripping means, and a light pickup hook on the plane.

The transfer of a constant force to the glider from a flying plane is made possible by using a pulley on the nose of the glider for the towline to work over during the acceleration period, and connecting one end of the towline to a source of constant predetermined force through a take-up line. When the other end of the towline is picked up by the flying plane, this take-up line at first pays out at approximately the speed of the plane, but as the glider gains speed, it gradually ceases to pay out and then pulls in at an increasing rate until the pulley has stopped turning, which means the glider has reached the speed of the plane, when take-up line is automatically released from the end of the towline while the latter is gripped in the pulley for continued towing.

An object of the present invention is to provide a hydraulic means for supplying the take-up line with a source of constant force.

A further object is to use a hydraulic mechanism operated against a pressure accumulator to provide a continuous pull through the take-up line on the towline passed around the pulley at the nose of the glider, thus to store up part of the energy during the first part of the accelerating operation above referred to, while the glider velocity is low, and return it during the latter part thereof, thereby continuously providing only half of the steady accelerating force on the glider, the other half being in the meantime supplied to the glider directly from the plane through the other portion of the towline passed around the pulley.

Figure 3:
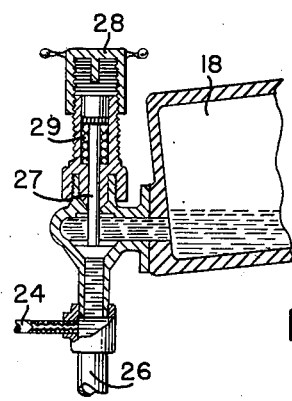
Figure 2:
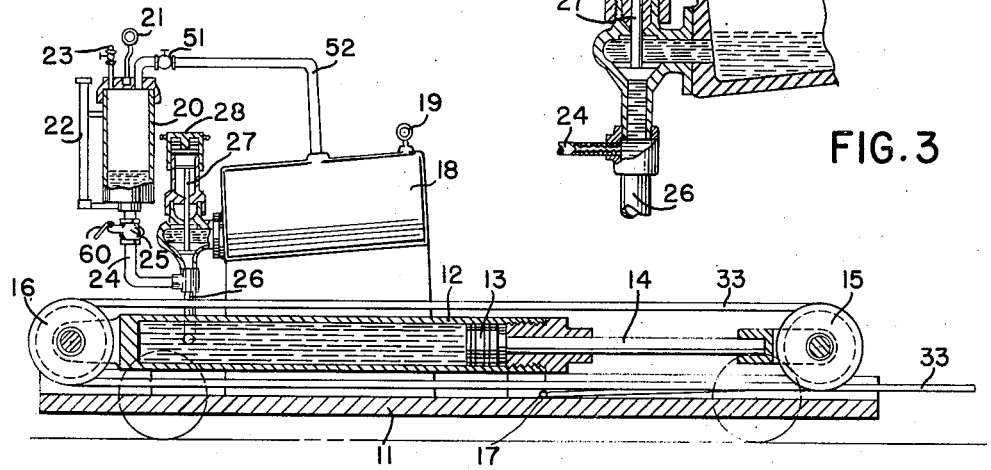
Figure 4:
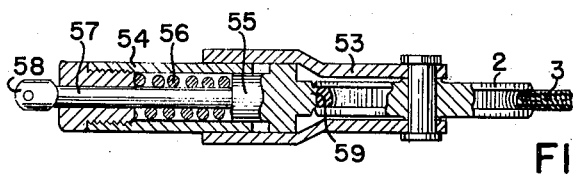
Figure 5:
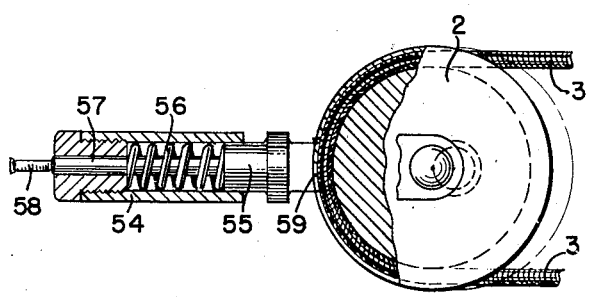
Figure 10:
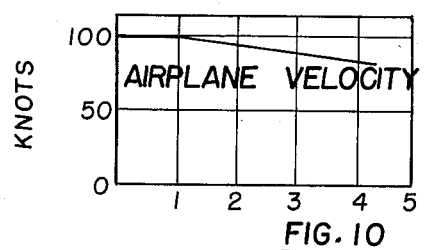
Figure 11:
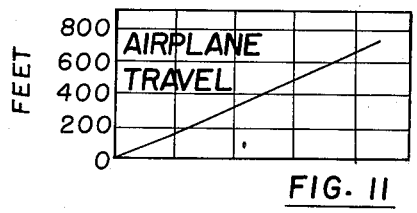
Figure 12:
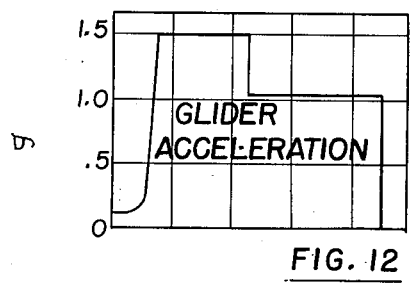
Figure 13:
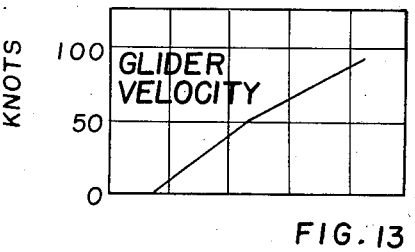
Figure 14:
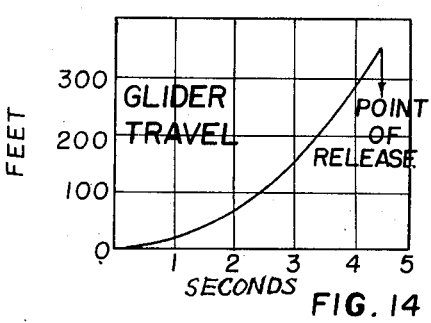
Figure 15:
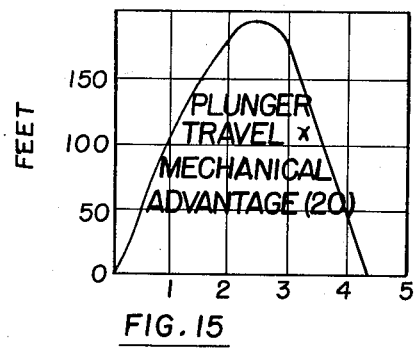
Figure 16:
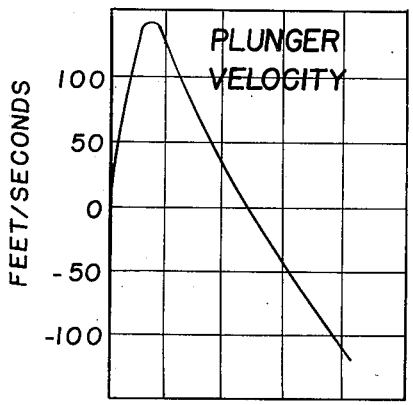
Figure 17:
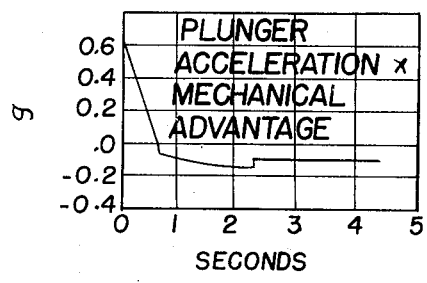

These and other more specific objects will become more apparent as the detail description of this invention proceeds. The preferred form of the apparatus is illustrated in the drawings wherein:

Fig. 1 shows the layout of the apparatus preparatory to the pickup operation,

Fig. 2 is an enlarged view, partly in section, of the portable hydraulic and accumulator means, Fig. 3 is a further enlargement of the main valve, Figs. 4 and 5 are side and plan views, respectively, of the pulley and gripping means attached to the glider, Figs. 6 to 9 are four consecutive views of the apparatus in its successive stages during the launching of the glider, and Figs. 10 to 17 are graphical illustrations of the characteristics obtained under one specific set of values used in the practice of this invention.

Referring more specifically to the several figures, the general layout of the apparatus may be seen in Fig. 1. The towline 3 is coupled at 32 to the take-up line 33 which passes from this coupling through the buffer 31, around the sheave 9 to the hydraulic means 10. From the coupling 32, the towline 3 is stretched back to the glider, passes around the pulley 2 attached to the nose of the glider, then back to sheave post 8, then sideways to the poles 5 and 6 where it ends in a loop 4 hung loosely on the poles so that it may be picked up by a pick-up hook pending from the plane which is to do the towing.

Figs. 2 and 3 show the details of the portable hydraulic mechanism 10 which has a hydraulic cylinder 12 and piston 13 with piston rod 14, a set of pulleys 15 at the end of rod 14, and a similar set 16 at the closed end of the cylinder. The take-up line 33 is passed around these pulleys and may be anchored at one end to the frame at 17, the other end being connected to the towline coupling as previously noted. The number of pulleys used in each of the sets determines the mechanical advantage of the mechanism. The cylinder 12 is connected by pipe 26 to an accumulator 18 by way of the main valve 27. Pipe 26 is connected by pipe 24 to the buffer tank 20 by way of check valve 25. Another pipe 52, with a small globe valve therein, connects the tops of the buffer tank and the accumulator. Manual means 60 is provided for lifting the check valve 25 off its seat. A sight gage 22 is provided on the buffer tank, and pressure gages 19 and 21 are mounted in the buffer tank and the accumulator respectively. A vent pipe 23 controlled by a globe valve is also provided in the top of the buffer tank.

The main valve 27 is normally held in its open position by spring 29. The knob 28 is turnably mounted by a screw-thread connection to the valve stem guide so that it can be screwed down to move the valve against the spring pressure to its closed position.

The details of the pulley attached to the glider may be seen in Figs. 4 and 5. The pulley 2 turns on a pin mounted in a yoke 53 having a sleeve portion 54 with a spring 56 therein compressed between a shoulder thereof and an enlarged portion 55 on pin 57 passing therethrough and having eyelet 58 at the outer end, which is fastened to the nose of the glider. The inner end of the enlarged portion 55 has a shoe 59 normally pressed against the towline 3 on the pulley to grip the towline with a force sufficient to overcome the pull on the towline necessary to tow the glider, but when a substantially greater force is applied to the towline such as is necessary during the glider acceleration, the spring 56 is further compressed to release the grip of the shoe 59 on the towline and permits the pulley 2 to turn freely, in accordance with the relative speeds of the plane and glider during the acceleration period.

The operation of the apparatus is as follows:

Referring to Figs 6 to 9, which represent four consecutive stages during the launching operation, Fig. 6 diagrammatically shows the starting set-up, with the pick-up plane 30 approaching the loop 4 of the towline. In Fig. 7 the towline has been picked up, the accelerating force applied to the glider is supplied jointly by the plane and the hydraulic mechanism.

The hydraulic system comprising the cylinder 13, the accumulator 18 and the buffer tank 20 is so controlled that the hydraulic pressure will convey a suitable force through the take-up line 33 and will permit the take-up line to move either one way or the other in order to maintain a substantially constant force throughout both the take-up line and the towline 3 which is half of the total accelerating force applied to the glider. This is done by maintaining a pressure in the accumulator 18 over the hydraulic medium of sufficient amount to act as a cushion and maintain a substantially constant pressure in the hydraulic system during the operation of the piston 13 on its advance and retract strokes. The buffer tank 20 is provided for furnishing a reduced pressure in the cylinder at the beginning of the operation so as to prevent too sudden a shock on the glider upon its initial movement.

Thus at the beginning the plunger 13 moves on its advance stroke against a reduced pressure, thus furnishing a reduced force for the initial acceleration of the glider while the hydraulic fluid is moved through the pipe 26, pipe 24 and check valve 25 into the buffer tank 20 against the low pressure of the air therein, valves 27 and 51 being closed at this time. As the piston 13 advances further and the pressure increases in the hydraulic system, it causes the valve 27 to open even against the high pressure in the accumulator. As soon as the valve 27 begins to open, spring 29 will raise it to its fully open position. Continued movement of the piston 13 then acts against the higher pressure in the accumulator to produce a substantially constant and reasonably large force to provide the necessary acceleration of the glider within the limits of the length of the towline for which it is designed. Fig. 8 shows the position of the piston on its retract stroke while maintaining the substantially constant force on the lines after about the middle of the acceleration period. In Fig. 9, the piston 13 is at the end of its retract stroke while the acceleration of the glider has suddenly dropped to practically zero. As a result of the decreased tension in the lines due to the sudden decrease of the acceleration of the glider and, therefore, of the accelerating force, the spring 56 in the connection between the pulley 2 and the glider has expanded and the shoe 59 has gripped the towline 3 against the pulley while at the same time the coupling 32 has reached the buffer 31 and has been released thereby, in accordance with the procedure outlined in the parent application. Thus the glider continues from this position in tow behind the tow plane with the towline fully extended therebetween. The charts shown in Figs. 10 to 17 show the characteristics of the plane and glider as well as the hydraulic plunger as obtained in one specific form of the invention used by the applicant. The curves are plotted against time in seconds. From these charts it may be seen that the airplane travels about seven hundred feet during the launching operation while the glider travels three hundred and fifty feet with an acceleration of not exceeding 1.5 g. The initial plane velocity being at approximately 100 knots, gradually reduces to about 90 knots at the end of the acceleration period, the energy lost being transmitted through the towline to supply the constant force of acceleration on the glider with the assistance of the hydraulic plunger which maintains this force at a substantially constant and desired amount. The mechanical advantage of the pulley arrangement on the specific form used in obtaining these characteristics was 20 to 1, by the use of 10 pulleys at each end of the hydraulic system.

Various other designs of this system may be made to suit the requirements. The device of the apparatus used here may be changed in form and dimensions as desired without departing from the scope of this invention which is defined in the appended claims.

The invention described herein may be manufactured and used by or for the Government of the United States of America for governmental purposes without the payment of any royalties thereon or therefor.

What is claimed is:

1. A supporting frame, a hydraulic system mounted thereon including a hydraulic cylinder, a piston movable therein, a substantially constant pressure accumulator connected to said cylinder through an unrestricted passage with a cut-off valve therein for maintaining a substantially constant pressure in said cylinder when said cut-off valve is open regardless of the position of the piston, a take-up line having one end anchored to said frame, mechanical advantage motion transmitting means between the free end of the line and its fixed end, operated by the piston for paying out or pulling in said free end while applying a substantially constant force thereto which is a multiple of the hydraulic pressure on the piston and resilient means for normally maintaining said valve open.

2. A hydraulic system including a cylinder and piston hydraulically biased therein by a substantially constant pressure, a pressure reservoir connected to said cylinder through a cut-off valve for supplying said bias when said valve is open, resilient means for normally maintaining said valve open, a take-up line, and motion transmitting means between the piston and said take-up line for providing a tension therein in accordance with the reservoir pressure.

3. A hydraulic system including a cylinder, a piston hydraulically biased therein, a pressure reservoir having a connection to said cylinder for supplying the bias, valve means in said connection, a buffer tank at a lower initial pressure connected to said cylinder, said valve means including a cut-off valve with resilient means for normally maintaining it open and manual means for closing it to cut off the pressure reservoir from the cylinder, said valve remaining closed thereafter in response to the pressure in said reservoir until the pressure in the buffer tank is raised by movement of the piston inwardly to substantially the pressure in said reservoir, a take-up line, and motion transmitting means between the piston and said take-up line for providing a continuous tension therein in accordance with the pressures first in the buffer tank and then in the reservoir as the take-up line is payed out.

4. A hydraulically operated mechanism comprising a buffer tank partly filled with the hydraulic medium, an accumulator tank also partly filled with the hydraulic medium, a hydraulic cylinder connected to the accumulator tank through a main automatic cut-off valve and to the buffer tank through a check valve, a piston hydraulically biased by said hydraulic medium in said cylinder, a conduit between the tops of the tanks having a manual cut-off valve therein, light resilient means for normally holding said main cut-off valve in an open position inwardly in respect to the accumulator tank, and manual means for pushing said valve into closed position whereupon it will remain closed as long as the pressure in the accumulator exceeds that in the cylinder plus the light force of the resilient means but will open when the pressure in the cylinder and buffer tank is raised to balance that in the accumulator tank, a take-up line having one end fixed and mechanical advantage motion transmitting means between the free end of the line and the piston.

5. A portable frame, a cylinder mounted thereon, an accumulator providing a substantially constant hydraulic operating pressure connected thereto, a piston reciprocable therein operating against said substantially constant pressure, a cut-off valve in said connection normally resiliently held open and responsive to differential fluid pressure to remain closed when moved into closed position until the pressure in said cylinder substantially exceeds that in said accumulator, a take-up line with one end fixed to said frame, the other end being free to move within a range depending on the length of the piston stroke, and mechanical advantage motion transmitting means between said free end of the line and the piston.

6. A portable frame, a hydraulic cylinder mounted thereon, a piston operating therein, a take-up line with one end fixed to said frame, the other end being free to move within a range depending on the length of the piston stroke, mechanical advantage motion transmitting means between said free end of the line and the piston, an accumulator connected to said cylinder for supplying a predetermined constant pressure, a pressure actuated main cut-off valve for said accumulator, and a buffer tank connected to said cylinder for supplying a gradually increasing cushioning force to the line upon its free end being initially moved away from the frame until the force reaches said predetermined pressure, said predetermined pressure being sufficient to actuate said main cut-off valve into open position, said accumulator thereafter continuously supplying a substantially constant force to the line regardless of the speed of movement of said free end toward or away from said frame within its range of motion.

7. A hydraulically controlled device comprising a buffer tank partly filled with the hydraulic medium and having a sight gauge, a vent with a shut-off valve therein, a pressure gauge and a check valve with manual means for opening it, an accumulator tank also partly filled with the hydraulic medium and having a main valve connected to its lower portion with resilient means for normally holding it open inwardly with respect to the tank and having manual means for closing it and a pressure gauge, a hydraulic cylinder filled with the hydraulic medium and having a piston operative therein, a conduit between the tops of the tanks with a cut-off valve therein, a three-way conduit between the main valve, the check valve and the cylinder, a take-up line with one end fixed, the other end being free to move within a range depending on the length of the piston stroke, and mechanical advantage motion transmitting means between the free end of the line and the piston.

8. In a hydraulic system, a cylinder having a chamber and a piston operating therein, a main accumulator connected by a conduit to said cylinder chamber, said conduit having a main valve, resilient means for urging it into open position toward said accumulator, manual means for closing it, an auxiliary accumulator connected to said cylinder chamber through a check valve closing toward said cylinder, and conduit means connecting the tops of the accumulators and having a cut-off valve therein.

9. In a hydraulic system, a cylinder having a chamber and a piston operating therein, a main accumulator connected by a conduit to said cylinder chamber, said conduit having a main valve, resilient means for urging it into open position toward said accumulator, manual means for closing it, an auxiliary accumulator connected to said cylinder chamber through a check valve closing toward said cylinder, conduit means connecting the tops of the accumulators and having a cut-off valve therein, and a hydraulic medium filling said cylinder chamber and a part of the accumulators.

10. In a hydraulic system, a cylinder having a chamber and a piston operating therein, a main accumulator connected by a conduit to said cylinder chamber, said conduit having a main valve resilient means for urging it into open position toward said accumulator, manual means for closing it, an auxiliary accumulator connected to said cylinder chamber through a check valve closing toward said cylinder, conduit means connecting the tops of the accumulators and having a cut-off valve therein, a hydraulic medium filling said cylinder chamber and a part of the accumulators, and motion transmitting means mechanically connected to said piston for transmitting a mobile force in accordance with the hydraulic pressure continuously acting on said piston.

ROBERT B. COTTON.

(References on following page)

REFERENCES CITED

The following references are of record in the file of this patent:

UNITED STATES PATENTS

| Number | Name | Date |
|---|---|---|
| 693,133 | Hennebohle | Feb. 11, 1902 |
| 935,842 | Foley | Oct. 5, 1909 |
| 1,002,821 | Cowles et al. | Sept. 12, 1911 |
| 1,037,730 | Cowey | Sept. 3, 1912 |
| 1,277,297 | Davis | Aug. 27, 1918 |
| 1,351,867 | Oakes | Sept. 7, 1920 |
| 1,577,446 | Brown | Mar. 23, 1926 |
| 1,855,060 | Landenberger | Apr. 19, 1932 |
| 2,027,190 | Miner | Jan. 7, 1936 |
| 2,033,035 | Koons | Mar. 3, 1936 |
| 2,098,583 | Kleinsmith | Nov. 9, 1937 |
| 2,176,979 | Platz | Oct. 24, 1939 |

FOREIGN PATENTS

| Number | Country | Date |
|---|---|---|
| 770,980 | France | July 16, 1934 |